United States Patent
Konovalov et al.

[15] 3,686,522
[45] Aug. 22, 1972

[54] ROTOR WITH A LIQUID-COOLED WINDING FOR AN ELECTRICAL MACHINE

[72] Inventors: Boris Leonidovich Konovalov, 603 Mikroraion, I, kv. 346; Evgeny Khaimovich Glider, Prospekt Ordzhonlkidze, 18, kv. 55; Alexandr Abramovich Chigirinsky, ulitsa Kuibysheva, II, kv. 8; Oleg Borisovich Gradov, ulitsa Kosiora, 6, kv. I; David Bentsionovich Karpman, ulitsa Frantisheka Krala, 49, kv. 54; Boris Volkovich Spivak, ulitsa Kosiora, 56, kv. 55, all of Kharkov, U.S.S.R.

[22] Filed: Dec. 31, 1970

[21] Appl. No.: 103,129

[30] Foreign Application Priority Data

June 15, 1970 U.S.S.R. .................1438401

[52] U.S. Cl. ..........................310/54, 310/59
[51] Int. Cl. ...................................H02k 9/00
[58] Field of Search..........310/54, 53, 58, 59, 61, 64, 310/91

[56] References Cited

UNITED STATES PATENTS

| | | | |
|---|---|---|---|
| 3,131,321 | 4/1964 | Gibbs | 310/64 |
| 3,092,741 | 6/1963 | Horsley | 310/54 |
| 3,075,104 | 1/1963 | Willyoung | 310/64 |
| 3,465,183 | 9/1969 | Wallenstein | 310/64 |

FOREIGN PATENTS OR APPLICATIONS 1,128,541  4/1962  Germany.....................310/64

*Primary Examiner*—J. D. Miller
*Assistant Examiner*—R. Skudy
*Attorney*—Holman & Stern

[57] ABSTRACT

A rotor with a liquid-cooled winding for an electrical machine, in which a distribution manifold for a liquid coolant is located in the rotor shaft and is made up of separate replaceable insert elements which have a higher resistance to corrosion than the rotor shaft material, the rotor being provided with axial passages connected with liquid inlet or outlet ducts with the help of radial ducts.

The corrosion-resistant elements may be secured in the shaft with the help of projections, wedges or a band ring and have axial apertures. The axial apertures in said elements are coaxial with the axial passages of the rotor shaft and accommodate sealing and insulating elements.

5 Claims, 4 Drawing Figures

ROTOR WITH A LIQUID-COOLED WINDING FOR AN ELECTRICAL MACHINE

The present invention relates to electrical machines, and more specifically to electrical-machine rotors with liquid-cooled windings.

In the prior art, there is an electrical machine having a rotor with a liquid-cooled winding, in which there is a cooling-liquid distribution manifold formed by a system of intercommunicating ducts. The ducts of the manifold are made directly in the body of the rotor.

A disadvantage of this prior-art rotor is that the cooling liquid admitted into the distribution manifold comes in direct contact with the rotor metal and makes it corrode.

An object of the present invention is to provide an electrical-machine rotor with a liquid-cooled winding, that will not corrode.

With this object in view, the invention resides in that in an electrical-machine rotor with a liquid-cooled winding, comprising a distribution manifold made into the rotor body and formed by a system of intercommunicating ducts, the said ducts are, according to the invention, made in renewable corrosion-resistant blocks and fastened in recesses on the rotor body.

It is preferable that the renewable blocks should have shoulders fitting into corresponding notches in the rotor in order to fasten them on the rotor.

The renewable blocks may be fastened in the rotor by wedges or a binding ring.

The invention will be more fully understood from the following description of a preferred embodiment when read in connection with the accompanying drawings wherein.

Figure 1:
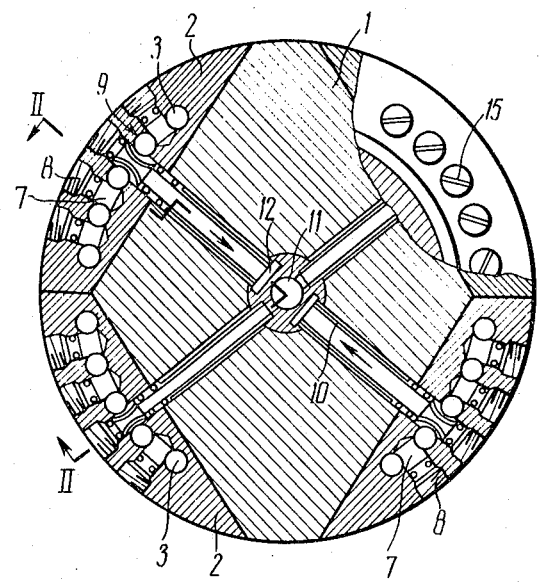
FIG. 1 is a cross-sectional view through the ducts of the distribution manifold of an electrical-machine rotor with a liquid-cooled winding, according to the invention.
Figure 2:
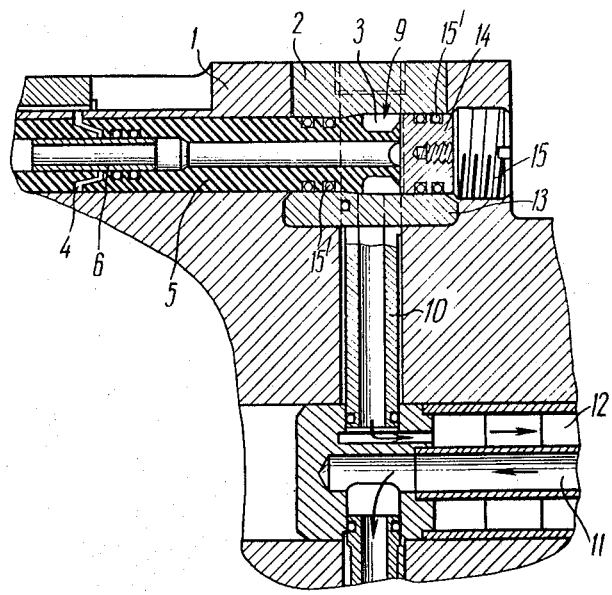
FIG. 2 is a part section II—II of FIG. 1.

Referring to FIG. 1, there is an electrical-machine rotor 1 with a liquid-cooled winding (not shown in the figure), which has recesses accommodating renewable corrosion-resistant blocks 2. The blocks 2 have axial ducts 3 concentric with respective ducts 4 (FIG. 2) made in the body of the rotor 1. The ducts 4 are insulated with insulating tubes 5 which are in communication with the axial ducts 3 on one side and with the outlets 6 of the cooled winding of the rotor 1 on the other. In each block 2, the axial ducts 3 are held in communication with one another by holes 7 (FIG. 1) stopped by plugs 8, thereby forming a cooling-liquid distribution manifold 9 which is held by a corrosion-resistant tube 10 placed in a radial duct in the body of the rotor 1 in communication with either an inlet duct II or an outlet duct 12 for cooling liquid. In the radial direction, the renewable blocks 2 are held stationary in the body of the rotor 1 by shoulders 13 (FIG. 2) fitting into corresponding notches in the body of the rotor 1. The insulating tubes 5 are prevented from moving axially by sealing plugs 14 and screw plugs 15. At points of contact between the blocks 2 and the insulating tubes 5 and plugs 14 there are sealing rings 15'.

Figure 3:
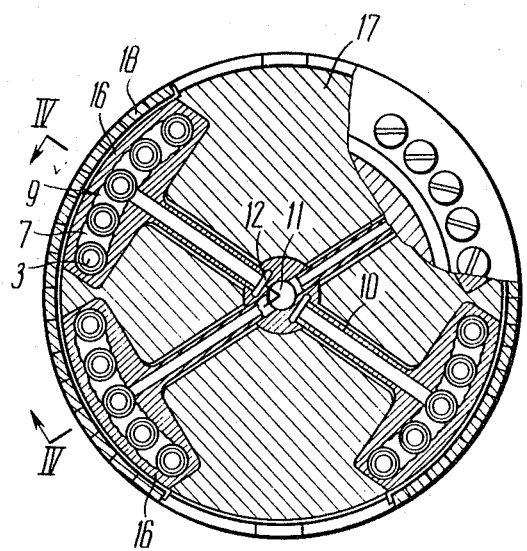
FIG. 3 is a cross-sectional view through the ducts of the distribution manifold of the rotor according to the invention, with a second embodiment of renewable blocks.
Figure 4:
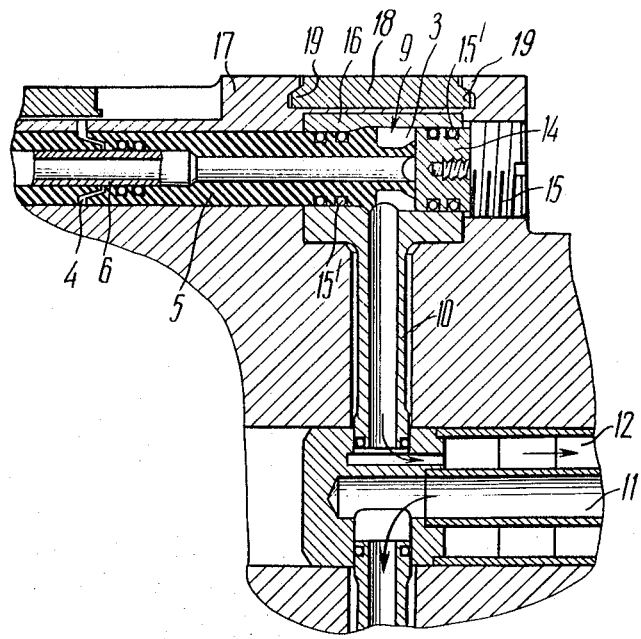
FIG. 4 is a part section IV—IV of FIG. 3.

FIGS. 3 and 4 show a second embodiment for fastening the renewable corrosion-resistant blocks 16 in the body of the rotor 17. In this embodiment, the blocks 16 are held in recesses of the rotor 17 by wedges 18 fitting with their projections 19 into an annular groove in the body of the rotor 17.

Alternatively, the blocks 16 may be held in the recesses of the rotor 17 by a binding ring (not shown in the drawing).

In operation, cooling liquid enters the duct II (FIG. 2), flows through tubes similar to 10 to the distribution manifolds 9 in the blocks 2, and is admitted by the insulating tubes 5 to the cooled winding of the rotor 1 winding (not shown in the drawing).

Since the cooling liquid does not come in direct contact with the rotor, the metal of the rotor is prevented from corrosion. Besides, since the ducts of the distribution manifolds are made in renewable blocks, they may be replaced or repaired if and when necessary, without having to withdraw the rotor from the stator.

What is claimed is:

1. In an electrical machine rotor having a liquid-cooled winding wherein a means for liquid cooling of the winding comprises at least two liquid-coolant distribution manifolds and axial passages formed in the rotor shaft, an improvement consisting in that said distribution manifold comprises at least one replaceable insert member of a material which is more corrosion resistant that the rotor shaft material, and being secured to the periphery of said rotor by a plurality of removable members the insert member being made in the form of a block having a liquid tight passage and apertures coaxial in assembly with said axial passages of the rotor shaft, at least one recess being provided along said rotor periphery for accommodating said replaceable insert members whereby, the liquid coolant is made to flow through said liquid tight passage and apertures and does not come in contact with the rotor material in the region of the insert member thereby preventing corrosion of rotor material in said region.

2. An electrical machine rotor having a liquid-cooled winding as claimed in claim 1 and a plurality of said insert members, which further includes insulating tubes located in said axial passages of the rotor shaft, said tubes partly extending into said insert through said apertures; and sealing means to seal one end of the passage in each said insulating tube from a respective said insert member and to seal the other end of said passage from an associated winding conductor.

3. An electrical machine rotor as claimed in claim 1, wherein said replaceable insert members which are made as blocks of corrosion-resistant material have shoulders engaging in complementary recesses in the rotor.

4. An electrical machine rotor as claimed in claim 1, wherein at least one groove is provided along the rotor periphery to accommodate said blocks, and means comprising a circumferential band ring are provided on the rotor to securingly retain the insert-members in place.

5. An electrical machine rotor as claimed in claim 1, wherein said removable members comprise a plurality of wedges and threaded plugs to secure said block in said recess of said rotor.

* * * * *